Sept. 14, 1943.   R. L. HAVER   2,329,369
BALL AND SOCKET JOINT
Filed March 28, 1942

INVENTOR
Ralph L. Haver
BY Everett N. Curtis
ATTORNEY

Patented Sept. 14, 1943

2,329,369

UNITED STATES PATENT OFFICE 2,329,369

BALL AND SOCKET JOINT

Ralph L. Haver, San Diego, Calif., assignor to The Ryan Aeronautical Company, San Diego, Calif., a corporation of California Application March 28, 1942, Serial No. 436,579

1 Claim. (Cl. 285—11)

My invention relates to ball and socket joints, particularly those used for making connection between the exhaust ports of combustion engines and discharge manifolds.

More especially my invention is an improvement upon the universal joint shown and described in U. S. Letters Patent No. 2,219,752, granted to Fred H. Rohr and another October 29, 1940, and now in extensive use.

One object of my said improvement is to permit the ready removal and replacement of the rear or outermost ball socket with a minimum of time and effort, and to eliminate the necessity of removing the manifold or collector ring body or shifting of the engine.

Another object is to dispense with the stop collar or retainer ring heretofore used and at the same time to effect necessary replacement and adjustments without disturbing or having to remove adjacent or communicating parts.

While the prior Rohr universal joint has been found to be of great commercial utility in actual practice, considerable difficulty has been experienced with this construction when found necessary to effect repairs or to make replacement of parts, and particularly has this been the case with the rear ball socket rigidly connected as it is with the exhaust manifold. While it is possible to remove the forward ball socket and to replace the same, upon releasing the stop collar thereof, this cannot be done with the rear socket, which must be repaired, if it is repaired at all, while connected to the manifold—a difficult operation, necessitating either the removal of the manifold or effecting such repairs while the rear socket is still in operative position. Also it has been found that the employment of the stop collar or retainer collar now employed to hold the two sockets in operative position necessitates very careful and proper adjustments in order to avoid undue wear in the ball joints themselves. The elimination of such stop collar in my improved construction obviates the possibility of such wear, and goes far to render such construction as fool proof as possible. With my improved joint, both the rear and forward ball sockets are made easily accessible and removable for repair or replacement, undue wear is therefore eliminated and such parts accordingly may be readily serviced.

My invention further consists in various other features and improvements illustrated in the drawing and hereinafter more particularly described and claimed.

Attention is hereby directed to the drawing in which similar numerals of designation refer to similar parts throughout the several views, and in which—

Figure 1:
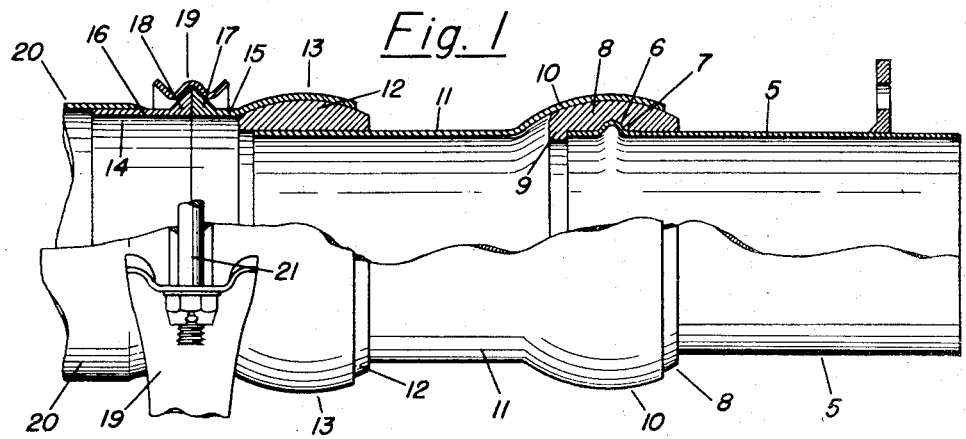
Figure 1 is a longitudinal side elevation, partly in cut away section, of one of the preferred forms of my improved tube joint.

Referring to the Figure 1 of the drawing, the outlet 5, leading from the engine exhaust port of a combustion engine (not shown) is of the usual form of construction, except that near the end thereof is an annular ridge or bulge 6 in the wall thereof, which ridge is shaped to engage with the annular slot 7 depressed in the inner wall of the cuff 8, and serves to secure the same firmly in position upon the end of said outlet. As a further aid in the firmer seating of said cuff, I preferably construct the same with the annular inwardly extending lip 9, abutting against the end of the exhaust outlet 5. This cuff 8 is preferably of substantial thickness relative to and as compared with the wall of said outlet, and the external face thereof is made spherical in contour to engage with a similarly shaped inner face of the forward socket 10 of the tubular member 11; the connection of said cuff 8 and member 11 thereby forming a universal joint of the ball and socket type and permitting movement of said member at any required angle.

Upon the end of the tubular member 11, opposite to the end containing the socket 10, I mount the cuff 12 which is similar in construction to the cuff 8, except for the omission therein of the annular slot 7, and the annular lip 9. As with the cuff 8, the outer face of the cuff 12 is made spherical in contour to make ball and socket contact with the similarly shaped surface of the rear socket 13 of the tubular attachment 14, which is preferably made in two sections 15 and 16 provided at their abutting ends with the annular outwardly extending lips 17 and 18 normally held together by a clamp or removable collar 19. Preferably the clamp 19 is made in two arcuate parts secured by bolts 21, passing through adjacent openings therein as is well understood in the art. Telescoping contact of the end of the section 16 is made as shown with the tubular inlet 20 to the exhaust manifolds to which said section is preferably welded at the point of contact. The construction and insertion of this tubular attachment 14 in a universal tube joint is new in the art, and is an important improvement of great practicable advantage, in that upon the release of the clamp 19, the section 15 may readily be removed together with the tubular member 10, and may at once be replaced or taken away and repaired in the shop.

Figure 2:
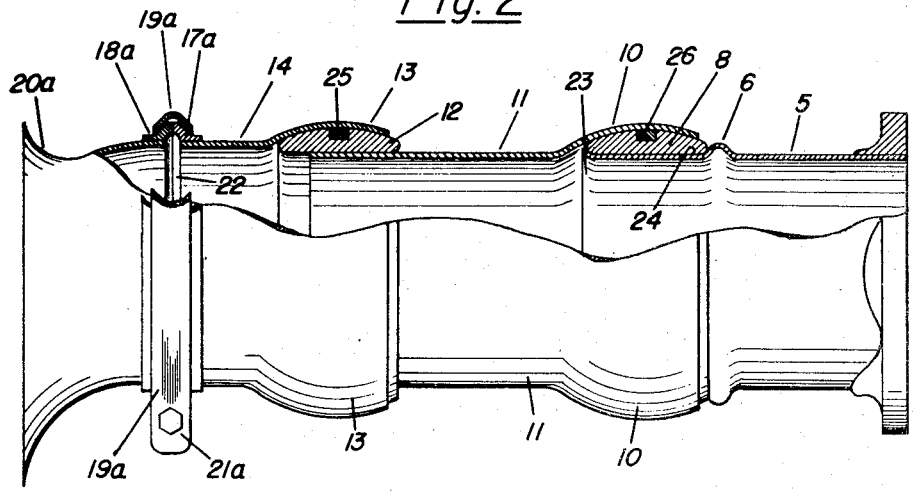
Fig. 2 is a similar view of a modification of my invention.

In Fig. 2, I have shown a construction somewhat similar to that illustrated in Fig. 1. In this form of my invention, however, I have dispensed with section 16 of the attachment 14, and made the same in one piece and have made telescopic connection thereof directly with the tubular inlet 20a. Also in place of the lips 17 and 18, shown as respectively integral with sections 15 and 16, I have supplied the rings 17a and 18a which are welded or brazed to the adjacent ends of attachment 14 and tubular inlet 20a to the exhaust manifolds. These rings are so shaped as to register their outside opposing edges, and may form between them the annular groove 22. A clamp 19a similar to clamp 19 and similarly formed in two semicircular parts, and shaped to engage with said rings, serves through bolts 21a releasably to hold together in operative alignment the tubular attachment 14 and the manifold inlet 20a. In this modified form of my invention, I have also changed the location of the ridge 6, and have further extended the end of the outlet 5 to form the flaring mouth 23, and the wide annular groove 24 shaped to receive and seat the cuff 8. If desired, sealing rings 25 and 26, installed in the well known manner in annular slots provided therefor in cuffs 8 and 12, may be provided to secure gas tight joints in the sockets 10 and 13.

Figure 3:
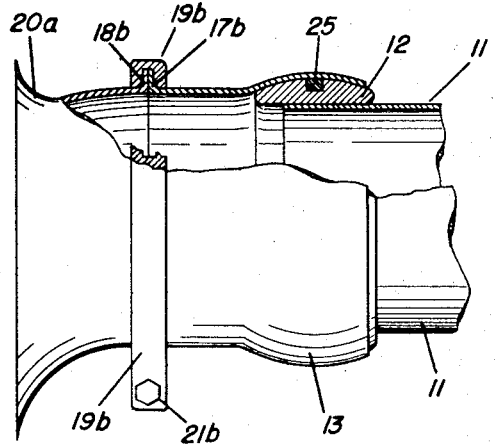
Figs. 3 and 4 are views of the modification of the connection of the detachable section containing the rear socket with the inlet of the exhaust manifold.
Figure 4:
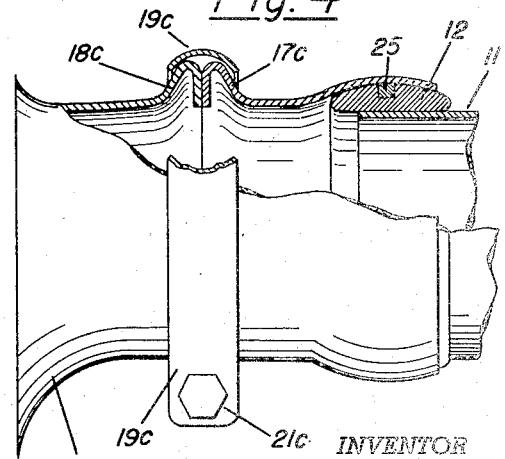

In Figs. 3 and 4, I have shown modifications of the securing means for uniting the end of the tubular attachment to the adjacent end of the manifold inlet. In Fig. 3, I have shown said adjacent ends bent upwardly to form the rims 17b and 18b, which are to be secured together by the two piece clamp 19b and bolts 21b. And in Fig. 4, I have shown said adjacent ends bent upwardly and downwardly to form the annular convolutions 17c and 18c, which are to be secured together by the two piece clamp 19c and bolts 21c.

Preferably, I employ as suitable material for the outlet and inlet tubes 5 and 20 and 20a, the tubular member 11 and the tubular attachment 14—stainless steel, nickel alloys or other heat resisting material, while for the cuffs 6 and 12, I preferably use cast iron alloy or other heat resistant material. The rings 26 and 25 may be of any suitable material.

My invention may be embodied in other specific forms without departing from the spirit or essential characteristics thereof. The present embodiment, as above set forth, is therefore to be considered in all respects as illustrative and not restrictive, the scope of my invention being indicated by the appended claim rather than by the foregoing description, and all changes which come within the meaning and range of equivalency of the claim are therefore intended to be embraced therein.

What I claim and desire to secure by Letters Patent is:

A flexible conduit connection between a pair of conduit elements comprising, in combination, a first tubular section having at one end thereof a universal joint connection with one of said conduit elements, a second tubular section having at one end thereof a combined telescopic and universal joint connection with the other end of said first mentioned tubular section, and means detachably connecting the other end of said second mentioned tubular section to the other of said conduit elements to permit removal and replacement of said second mentioned tubular section without disturbing said conduit elements.

RALPH L. HAVER.